Nov. 25, 1969  M. E. MARTIN  3,480,938
ANNUNCIATOR SYSTEM
Filed Feb. 5, 1965  2 Sheets—Sheet 1

INVENTOR
Merle E. Martin
BY
ATTORNEY

Nov. 25, 1969   M. E. MARTIN   3,480,938
ANNUNCIATOR SYSTEM
Filed Feb. 5, 1965   2 Sheets-Sheet 2

INVENTOR
Merle E. Martin
BY
ATTORNEY

United States Patent Office 3,480,938
Patented Nov. 25, 1969

3,480,938
ANNUNCIATOR SYSTEM
Merle E. Martin, Dallas, Tex., assignor to Beta Corporation, Dallas, Tex., a corporation of Texas
Filed Feb. 5, 1965, Ser. No. 430,577
Int. Cl. G08b 25/00
U.S. Cl. 340—213.1
17 Claims The present invention relates to annunciator systems for monitoring the operation of various types of processes and equipment and indicating the presence of a malfunction and, more particualrly, to an annunciator system especially adapted for operation in either the first out mode or the marked acknowledge mode and which is readily adapted to be responsive to different types of signals.

Many types of complex processes and equipment are operated from a central control room. In such a central control room, it is common to provide an annunciator system which is connected to selected stations for monitoring the operation of the processor equipment. In the event of a malfunction, a signal device is energized for indicating the presence of a malfunction. Normally, an audible warning device will also be actuated.

When a variable being monitored becomes abnormal, a pair of field contacts are actuated to operate an alarm signal. Normally, both visual and audible alarms are provided. Several different types of signals may be produced when the field contacts are operated. However, four signals are most commonly used. These are: (1) a normally open contact will be closed to provide a ground; (2) a normally open contact will be closed to provide a potential; (3) the contact will be normally closed to ground and will open when the variable becomes abnormal; and (4) the contact will normally be closed to a source of potential and will open when the variable becomes abnormal. Obviously, it would be highly desirable if a single annunciator system could be made responsive to any one of the four most commonly utilized abnormal indications.

Many annunciator systems either operate in the first out mode or the marked acknowledge mode. Thus, for example, in many types of processes, failure or malfunction at some point in the process can result in extensive damage to the processing equipment if the process is permitted to continue. Accordingly, in many types of processing equipment, it is common to provide automatic shut down equipment which will sequentially disable all of the equipment involved in the process to prevent damage. As each piece of equipment is shut down, it will be indicated on the annunciator panel by an indication of a malfunction. It is therefore desirable in such applications that the annunciator system be of the type that will operate in what is commonly referred to as the first out mode. In an annunciator system which operates in the first out mode, each of the stations being monitored will indicate the malfunction as the respective associated equipment is disabled. However, for purposes of determining and correcting the trouble in the item of equipment which actually malfunctions, a signal of different character is utilized for indicating the first station which signaled the presence of a malfunction.

In other applications, such as, for example, an annunciator system used for monitoring each of several compulsion engines which may be provided in an engine room, a system which operates in the marked acknowledge mode is usually preferred. In such a system, as each malfunction occurs, like signals will be provided. When the operator of the equipment becomes aware of the malfunction, he will acknowledge the indicated information by actuating a switch or by other means. When malfunctions are acknowledged by the operator, the character of the signals displayed will change. Succeeding malfunctions will again be indicated by an alarm signal of the initial character such that the next time the annunciator control panel is observed, it will be readily apparent to the operator whether succeeding malfunctions have occurred.

Annunciator systems are also characterized by being either of the latching or non-latching type. In a non-latching system, when a malfunction is corrected, the associated signal indicating the malfunction will be removed. In a latching system, the signal indicating a malfunction will persist even though the malfunction is corrected. The present invention provides an annunciator system which can be operated in either the marked acknowledge mode or the first out mode and either as a latching or non-latching system. Also, the improved annunciator system of the present invention is capable of operation responsive to several different types of signals and is characterized by its low degree of complexity and high degree of reliability.

In accordance with the present invention, a plurality of indicator units are provided. The number of indicator units is equal to the number of stations which are to be monitored with each of the stations providing to its associated indicator unit a signal responsive to the presence of a malfunction.

The indicator units are suitably of the plug-in modular type. Each of the indicator units includes a first signal generating means for producing a signal of one character and a second signal generating means for producing a signal of a different character. Each of the indicator units further includes first and second signal responsive elements and a switching device. The switching device is characterized by a normally high impedance but is switched to a low impedance state responsive to a control signal applied thereto and remains in the low impedance state so long as the current flowing through the device remains above a minimum level.

A first current path is provided which comprises the first and second signal responsive elements, and means effective responsive to the flow of current in the first current path for effecting the first alarm signal. A second current path is also provided. The second current path comprises the first signal responsive element, the switching device and means effective responsive to the flow of current in the second current path for effecting the second alarm signal.

Upon the occurrence of a malfunction, a signal is applied to the first signal responsive element of the associated indicator unit and causes an increase in current flow through the first signal responsive element. Responsive to an increase in current flow through the first signal responsive element, a signal is applied to the second signal responsive element for causing an increase in the flow of current through the second signal responsive element. When the acknowledgement means is operated, a control signal is applied to the switching device of a character to cause the switching device to switch to its low impedance state. Since the increased current flow through the first signal responsive element is greater than that required to maintain the switching device in the low impedance state, the switching device will remain in its low impedance state so long as the increased current flows through the first signal responsive element. Thus, so long as the increased current flows through the first signal responsive element, the second alarm signal will be effected.

In accordance with the preferred embodiment of the present invention, the first and second signal responsive means each comprise a transistor and the switching device comprises a silicon controlled rectifier. Also, in accordance with the preferred embodiment of the invention, when the silicon controlled rectifier is switched to its low impedance state, the second transistor is biased to turn the second transistor off, causing the first alarm signal to be de-energized. In order that the indicator unit can be most expeditiously utilized with all types of signals, still a third transistor is preferably provided, the third transistor being effective when turned on to turn on the first transistor. Also, it will be noted that in most instances the first transistor will only be conductive for the duration of the abnormal indication. However, if desired, means can be provided for continuously applying to the base of the first transistor a signal of a character to render the first transistor conductive following the presence of an abnormal indication.

The features of the present invention which are believed novel and inventive are set forth with greater particularity in the appended claims. Many objects and advantages of the invention will, however, become apparent to those skilled in the art as the following detailed description of a preferred embodiment of the invention unfolds when taken in conjunction with the appended drawings wherein like reference numerals denote like parts and in which:

Figure 6:
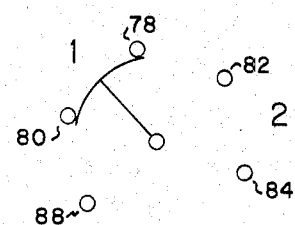
Figure 5:
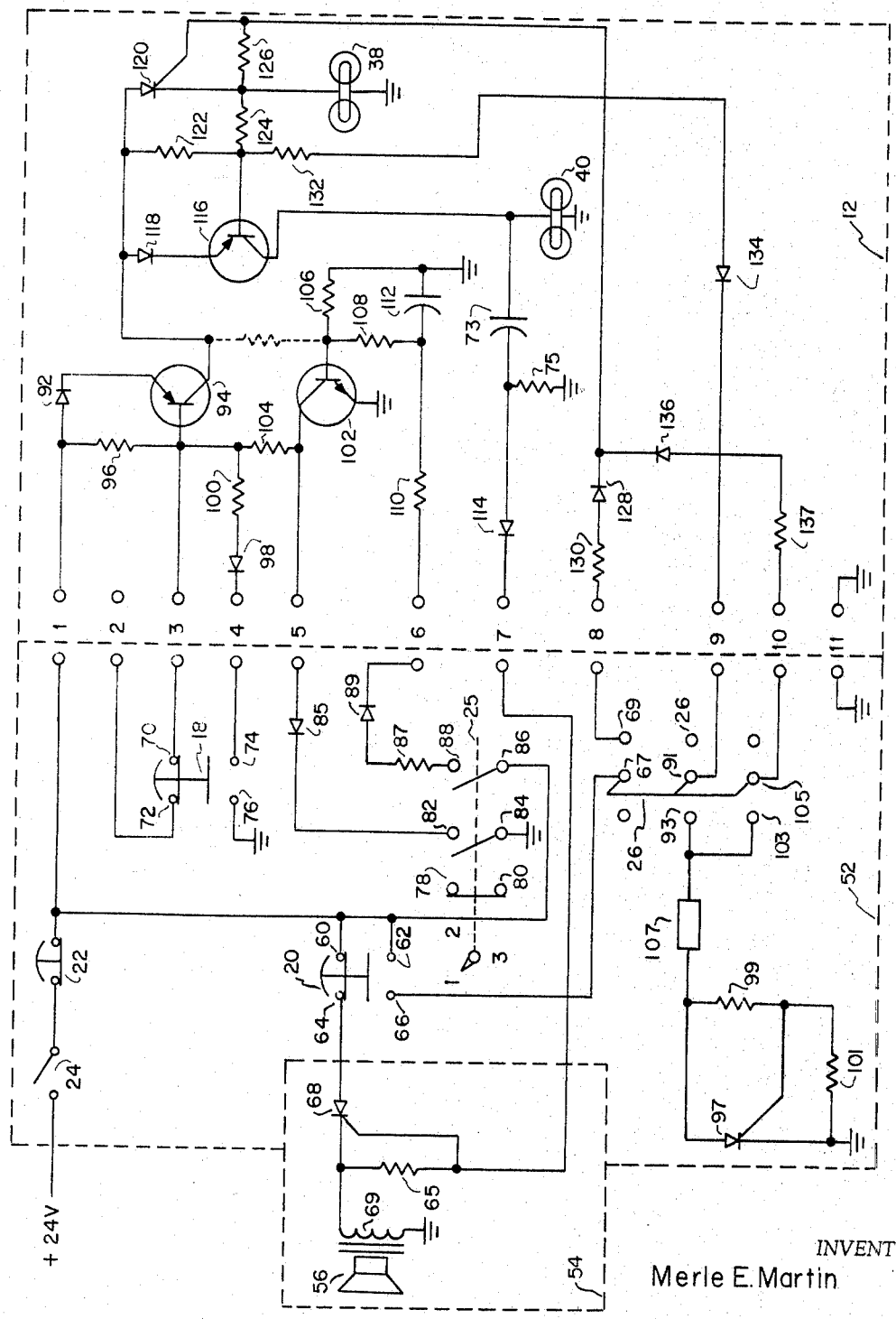
FIGURE 5 is a schematic diagram illustrating an annunciator indicator unit and control in accordance with the present invention.

FIGURE 6 schematically illustrates a switching arrangement suitable for use in practicing the present invention; and FIGURE 7 is a schematic illustration of four different types of field contacts which may be monitored by the indicator unit and control of FIGURE 5.

Figure 1:
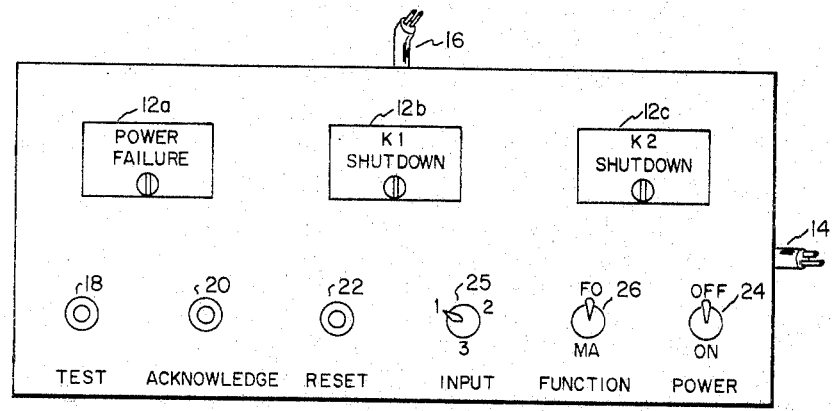
FIGURE 1 is a plan view illustrating an annunciator panel suitable for use with the present invention.

Turning now to the drawings, there is shown in FIGURE 1 a control panel 10 of the type suitable for use in practicing the invention. The control panel 10 can be seen to include a plurality of indicator units 12a–12c which are mounted in the upper surface of the control panel. Although only three indicator units are shown, it will be appreciated that the number actually utilized will vary, dependent upon the number of field stations to be monitored. In accordance with the preferred embodiment of the invention, the system is operated from a direct current supply source and, accordingly, a cable 14 is provided for connecting the panel 10 to a source of direct current supply voltage. Cable 16 is similarly provided for connecting the control panel 10 to the field stations which are to be monitored. Positioned on the panel 10 also is the Test Switch 18, an Acknowledge Switch 20, a Reset Swith 22, a power switch 24, an Input Selector Switch 25 and a Function Switch 26.

Figure 2:
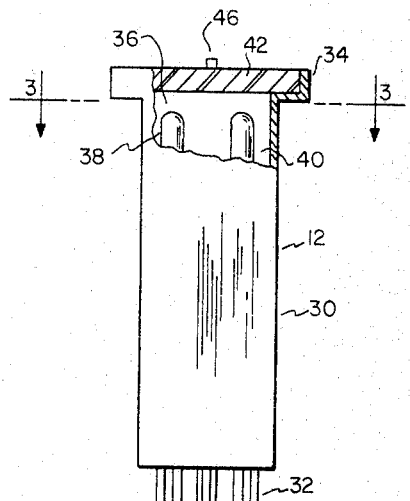
FIGURE 2 is a side elevation of an indicator module.
Figure 3:
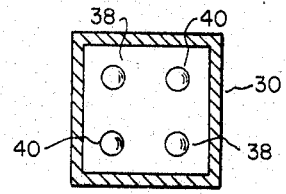
FIGURE 3 is a view taken along line 3—3 of FIGURE 2.

As best shown in FIGURES 2 and 3 of the drawings, the indicator units 12 are suitably of molded construction and include an elongated body portion 30 in which the circuitry associated with an indicator unit is enclosed. A plurality of pins 32 extend from the lower surface of the indicator unit for purposes of connecting the indicator unit to the control circuitry and power supply included within the control panel 10. The upper portion 34 of the indicator unit 12 is suitably enlarged and a cavity 36 is defined therein.

In accordance with the preferred embodiment of the present invention, four lamp bulbs are positioned within the cavity 36, two of the lamps being colored red, indicated by the reference character 38, and two of the lamps being white as indicated by the reference character 40. Positioned above the lamps 38 and 40 and extending into the cavity 36 is a body 42 of translucent light diffusing material. The body 42 of light diffusing material is suitably attached to the upper surface of the indicating unit by a thumb screw 46 and indicia may be provided thereon indicating the field station being monitored. When the red lamps 38 are energized, the material 42 will glow with a red color. When the lamps 40 are lit, material 42 will glow white.

Figure 4:
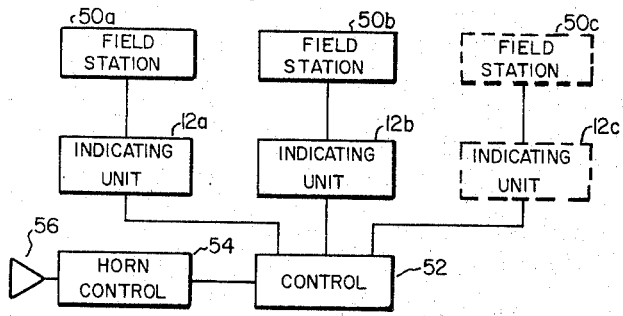
FIGURE 4 is a block diagram illustrating the principles of the present invention.

Referring now to FIGURE 4 of the drawings, there is shown a block diagram illustrating the cooperation in connection between the various elements of an annunciator system in accordance with the present invention. Thus, a plurality of field contact members 50 are provided. One of the field contact members 50 is associated with each field station to be monitored and in the event of a malfunction of the station being monitored, the field contact associated therewith will be either open or closed to apply either a ground or electrical signal to the annunciator system. One of the indicating units 12 is associated with each of the field contacts and connected thereto. Each of the indicator units 12 is commonly connected to a control unit 52. The control unit 52 is also connected to control unit 54 for a central warning device, suitably a horn 56.

In operation of the annunciator system of the present invention, a Power Switch 24 is placed in the on position to apply DC power to the control circuitry in the individual indicator units. Input Selector Switch 25 is placed in either position 1, 2 or 3, depending upon the type of signal produced by the field contact responsive to a malfunction and Function Switch 26 is positioned in accordance with the desired mode of operation, either Marked Acknowledge or First Out.

The Test Switch 18 is provided for purposes of assuring the operator that the system is operating properly. Thus, when the Test Switch is depressed momentarily, each of the indicator units should glow and the horn should sound.

The Acknowledge Switch 20 is depressed at such time as the operator notes the presence of a malfunction, and upon operation of the Acknowledge Switch, the circuitry is actuated to cause the red lamps to glow (if operated in the Marked Acknowledge mode), indicating an acknowledged condition and also causing the horn, if used, to be turned off.

The Reset Switch 22 is effective, when depressed, to momentarily interrupt the application of power to the system. Reset Switch 22 is normally only utilized when the indicator units are of the latching variety in which the alarm indications remain subsequent to removal of the malfunction.

The preferred embodiment of the present invention is shown in greater detail in FIGURES 5 and 6 of the drawings. Thus, as shown in FIGURE 5, it can be seen that each of the indicator units 12 includes pins 1–11 which are adapted to be received in sockets within a control panel. The sockets within the control panel are each connected in parallel such that each of the indicator units are connected to the control circuitry.

As shown in FIGURE 5, the control circuitry includes the Power Switch 24 which is adapted to be connected at one terminal to a source of positive DC supply voltage, suitable +24 volts, the other terminal of the switch 24 being connected to one terminal of the Reset Switch 22. The Reset Switch 22 is the push-button type and spring loaded in the normally closed position. The other terminal of the Reset Switch 22 is connected to terminal 1 of each of the sockets provided for receiving the indicator units 12. The other terminal of the Reset Switch 22 is also connected to terminals 60 and 62 of Acknowledge Switch 20 and to terminal 86 of Input Selector Switch 25. Acknowledge Switch 20 is of the press-button type also and is spring loaded to a position wherein switch 20 is closed between contacts 60 and 64 and normally open between contacts 62 and 66. Contact 64 of Acknowledge Switch 20 is connected to the anode of a silicon controlled rectifier 68 included within the horn control circuitry 54. Contact 66 of Acknowledge Switch 20 is connected to terminal 8 of each of the sockets which receive the indicator units 12 through terminals 67 and 69 of Function Switch 26.

The Test Switch 18 includes terminals 70, 72, 74 and 76. The Test Switch 18 is of the push-button type and spring loaded into a position wherein the switch is normally closed between contacts 70 and 72 and normally open between contacts 74 and 76. Terminals 70, 72 and 74 of the switch 18 are connected to terminals 3, 2 and 4, respectively, of each of the sockets which receive the indicators units 12. Terminals 76 of switch 18 is connected to ground.

As shown in FIGURE 6, the switch 25 suitably includes six terminals 78, 80, 82, 84, 86 and 88. Switch 25 is a three position rotary switch. Thus, when the switch is in position 1, terminal 78 is connected to terminal 80, when the switch is in position 2, the terminal 82 is connected to terminal 84, and when the switch is in position 3, the terminal 86 is connected to terminal 88. Terminals 78 and 80 of the switch 25 are suitably floating and not connected to any other point in the circuitry. Terminal 84 is connected to ground and terminal 82 is connected to terminal 5 of each of the sockets which receive the indicator units 12 through an isolating diode 85. It will be observed that terminals 82 and 84 are connected when the switch is in position 2. As metioned previously, terminal 86 of switch 25 is connected to the other terminal of the Reset Switch 22. Terminal 88 of switch 25 is connected to terminal 6 of each socket through separate current paths comprising resistor 87 and diode 89. When the switch 25 is in position 3, terminal 86 will be connected to terminal 88. If desired, an individual switch 25 can be associated with each indicator unit 12, permitting different types of abnormal signals to be utilized in a single system.

The terminal 9 of each of the sockets included on the control panel is connected through terminals 91 and 93 of switch 26, time delay 107 and silicon controlled rectifier 97 to ground as shown. The gate electrode of silicon controlled rectifier 97 is connected to its anode through resistor 99 and to its anode through resistor 101. The silicon controlled rectifier will therefore be turned on whenever a positive voltage is applied to its anode. Terminal 93 is connetced through terminals 103 and 105 to terminal 10. Terminal 11 is connected to ground.

The horn control 54 includes the silicon controlled rectifier 68. The cathode of the silicon controlled rectifier 68 is connected to the coil 69 of the horn 56, the other side of the coil 69 being connected to ground. The gate electrode of silicon controlled rectifier 68 is connected to terminal 7 of each of the sockets which receive indicator units 12 and through resistor 65 to the cathode of silicon controlled rectifier 68.

Each of the indicator units 12 is suitably as shown in FIGURE 5. Thus, pin 1 of the indicator unit is connected to the anode of diode 92, the cathode of the diode 92 being connected to the emitter of a PNP transistor 94. Pin 1 is also connected through resistor 96 to pin 3. It will be noted that pin 2 is floating. Pin 3 is also connected to the base of transistor 94. Pin 4 of each indicator unit is connected to the anode of diode 98, the cathode of diode 98 being connected to the anode of diode 98, the cathode of diode 98 being connected through resistor 100 to the base electrode of transistor 94. Pin 5 of the indicator module is connected to the collector of an NPN transistor 102 and through resistor 104 to the base of transistor 94. The emitter of transistor 102 is connected to ground. The base of transistor 102 is connected through resistor 106 to ground and through resistors 108 and 110 to pin 6. The juncture between resistor 108 and resistor 110 is connected through capacitor 112 to ground.

Pin 7 is connected to the anode of diode 114, the cathode of diode 114 being connected to the collector of PNP transistor 116 through capacitor 73. The juncture between diode 114 and capacitor 73 is connected to ground through resistor 75. The collector of transistor 116 is also connected through the parallel connected white lamps 40 to ground. The emitter of transistor 116 is connected to the cathode of diode 118, the anode of diode 118 being connected to the collector of transistor 94.

The collector of transistor 94 is also connected to the anode of silicon controlled rectifier 120 and through resistor 122 to the base of transistor 116. The base of transistor 116 is also connected through resistor 124 to the cathode of silicon controlled rectifier 120. The cathode of silicon controlled rectifier 120 is also connetced through parallel lamps 38 to ground and through resistor 126 to the gate electrode of the silicon controlled rectifier 120. The gate electrode of silicon controlled rectifier 120 is connected to the cathode of diode 128, the anode of diode 128 being connected through resistor 130 to terminal 8.

The base of transistor 116 is also connected to pin 9 through resistor 132 and diode 134. The gate electrode of silicon controlled rectifier 120 is also connected to pin 10 through diode 136 and resistor 137. Pin 11 is connected to provide a ground when inserted into the socket.

As mentioned previously, the presence of an abnormal condition can be indicated in several different ways, but normally will involve a change in potential. The more common manners for indicating an abnormal condition are indicated in Table I below which also shows the particular point to which the field contacts will be connected for different indications and the position of switch 26:

TABLE I

| Field Contact Condition | | Connect to Contact | Position of Switch 26 |
|---|---|---|---|
| Normal | Abnormal | | |
| Open | Closed to +24 v | 6 | 1 |
| Open | Closed to ground | 5 | 1 |
| Closed to +24 v | Open | 2 | 2 |
| Closed to ground | Open | 6 | 3 |

From the foregoing it is apparent that for each type of field-contact condition, a control circuit 52 is required. That is, the lead from each normally open field contact of a group that is closed to +24 v. by an abnormal condition is connected to terminal 6 of an associated indicating unit 12. These indicating units are connected in parallel to a common control circuit 52 having its switch 25 placed in position 1. Similarly, the lead from each field contact of a group that is normally closed to +24 v. and is opened by an abnormal condition would be connected to terminal 2 of an associated indicating unit 12. The latter indicating units are connected in parallel to a common control circuit 52 having its swith 25 placed in position 2. FIGURE 7 schematically illustrates four common types of field contacts, referred to in Table 1, and to which terminals they are connected on the associated indicating units. Thus, the system is flexible, the arrangement permitting the control circuit 52 and an associated group of indicating units to be easily connected to different types of field contacts.

For example, if the field contact is normally open and an abnormal condition is indicated by the contact closing to +24 volts, switch 25 would be placed in position 1 and each of the field contacts would be connected to a terminal 6 of the socket containing the associated indicator unit 12. If the system is to be operated in the Marked Acknowledge mode, switch 26 is placed in that position, connecting terminals 67 and 69 of switch 26. When the power switch 24 is closed, power will be applied to terminals 60 and 62 of Acknowledge Switch 20 and terminal 86 of switch 25. Power will also be applied through diode 92 to the emitter of transistor 94 and through the resistor 96 to the base of transistor 94. Transistor 94 will therefore be non-conductive.

When the Test Switch 18 is depressed, terminal 4 of each of the indicator units will be connected to ground through terminals 74 and 76 of switch 18, causing the potential at the base of transistor 94 to fall to a level sufficient to bias the transistor 94 on. When transistor 94 turns on, current flowing through its emitter collector circuit will increase, applying potential to the emitter of transistor 116. The collector of transistor 94 is also connected through resistors 122 and 124 and lamps 38 to ground, properly biasing the base of transistor 116 to cause transistor 116 to also turn on. When current flows through both transistors 94 and 116, the current will flow through the lamps 40 providing a white indication of all indicator units, indicating that the circuit is operating properly. When the switch 18 is released, it will return to its normal position in which terminals 74 and 76 are no longer connected, causing the base of transistor 94 to rise to a potential near that of its emitter, turning the transistor 94 off. When transistor 94 turns off, it will also be effective to turn transistor 116 off and lamps 40 will no longer be energized.

Upon the occurrence of a malfunction, pin 6 of the indicator unit associated with the field contact indicating a malfunction will rise to +24 volts. It will be noted that the isolating diodes 89 prevent this voltage being applied to the other indicator units. When the +24 volts is applied to pin 6, the transistor 102 will be biased on, permitting current to flow through a current path comprising resistor 96, resistor 104 and the collector emitter path of transistor 102. Upon the flow of current through transistor 102, transistor 94 will be biased on, resulting in the white lamps 4 becoming lit as described above with regard to the test sequence.

It will also be noted that when the transistor 116 turns on, positive voltage is applied through diode 114, capacitor 73 and diode 71 to the gate electrode of SCR 68, causing SCR 68 to be switched from a normally high impedance state to the low impedance state. When the SCR 68 switches to the low impedance state, power is applied to the coil 69 of the horn 56 through terminals 60 and 64 of the Acknowledge Switch 20 and the SCR 68, causing the horn to be energized. Thus, both a visual and audible alarm signal is provided.

When the Acknowledge Switch 20 is actuated by the operator, power will be applied through terminals 62 and 66 of switch 20 to the gate electrode of SCR 120, causing SCR 120 to become conductive, energizing the red lamps 38. It will also be noted that when SCR 120 conducts, it will bias the transistor 116 in a manner as to turn the transistor 116 off. Since the control signal will no longer be applied to the gate of SCR 68 and since the conductive path through terminals 60 and 64 of switch 20 is open, SCR 68 will return to its high impedance state, causing the horn 56 to be de-energized. Thus, when Acknowledge Switch 20 is actuated, the red lamps 38 will be energized and the horn 56 and lamps 40 will become de-energized.

It will also be noted that the SCR 120 will remain in its low impedance state, causing the lamps 38 to be energized, until either the malfunction is removed or the Reset Switch 22 is operated. Upon the occurrence of either of these two events, transistors 102 and 94 will turn off, preventing further current flow through SCR 120. The SCR 120 will thereupon return to its normally high impedance state.

Turning again to Table I, it will be seen that if the field contact is normally open and closed to ground to indicate a malfunction, the field contact would be connected to terminal 5 of an associated socket with the switch 25 remaining in position 1. Upon occurrence of a malfunction, terminal 5 of the associated socket would be placed at ground potential, permitting current to flow through the voltage divider network comprising resistor 96 and 104 to bias the base of transistor 94 such as to turn the transistor 94 on. Once the transistor 94 turns on, operation of the apparatus will be as described above. It will again be noted that the isolating diode 85 is provided to prevent the presence of a malfunction at one field contact, influencing operation of all of the indicator units.

In similar fashion, when the field contacts are normally closed to +24 volts and a malfunction is indicated by the field contacts opening, each of the field contacts are connected to terminal 2 of the associated socket. It will be noted that switch 18 must include a number of terminals 70 and 72 equal to the number of indicator units in the control panel in order that individual paths may be provided between each of the terminals 2 and 3.

Alternatively, terminal 72 can be connected to switch 22 and the field contacts each connected at one terminal to terminal 70 of switch 18 and connected at the other terminal to terminal 3 of the socket receiving the associated indicator unit. So long as the normal indication, positive +24 volts, is present, the base of the transistor 94 will be sufficiently positive that it will be biased off. However, upon occurrence of the malfunction, the associated field contact will open. Upon this occurrence, the flow of current through resistors 96 and 104 and the contacts 82 and 84 of switch 25 will bias the base of the transistor 94 to turn the transistor 94 on. Once the transistor 94 turns on, the operating sequence is as described previously.

When the field contact is normally closed to ground and an abnormal indication is indicated by the contact opening, the switch 25 is placed in position 3 and each field contact is connected to terminal 6 of the associated socket. It will be noted that when switch 25 is in position 3, each terminal 6 is connected to +24 volts through a resistor 87, diode 89 and contacts 86 and 88 of switch 25. So long as each terminal 6 is at ground potential, indicating a normal condition of the associated field contacts, transistor 102 will remain off and no indication will be present. However, upon occurrence of a malfunction, the field contact will open and the associated pin 6 will no longer be grounded. When ground is removed from the associated pin 6, a positive voltage will be applied to the base of transistor 102, causing transistor 102 to turn on. Once the transistor 102 turns on, it will provide a conductive path for biasing the transistor 94 on, as described previously, and thereafter the sequence of operation will be as described previously.

The foregoing description has been made with regard to operations wherein the Function Switch 26 is set for operation in the Marked Acknowledge mode. In the event that it is desired that the system operate in the first out mode, the switch 26 is positioned accordingly, causing the switch to be open between terminals 67 and 69, closed between terminals 91 and 93 and closed between terminals 103 and 105. The turn on of transistors 94, 102 and 116 will be the same as described above with regard to operation in the marked acknowledge mode in the event of a malfunction at an associated field contact. However, the cooperation between the transistor 116 and the silicon controlled rectifier 120 will be somewhat different as will be the effect of operation of the Acknowledge Switch 20.

Thus, with the Function Switch 26 in the first out position, when the first field contact within a group, the group, comprising the field contacts associated with the indicator units 12 that are commonly connected to the single SCR 97 through Function Switch 26, becomes abnormal, current will momentarily flow through the transistor 116, causing lights 40 to become lit. A positive voltage is also applied to the anode and gate electrode of silicon controlled rectifiers 97 and 120, causing silicon controlled rectifiers 97 and 120 to switch to the low impedance state and remain in the low impedance state so long as the transistor 94 remains on. The time delay 107, however, insures that silicon controlled rectifier 120 will turn on before silicon controlled rectifier 97. The lamps 38 of the first indicator unit to indicate a malfunction will therefore be energized.

However, since the gate electrode of the silicon controlled rectifier 120 of each of the other indicator units within the group is connected to ground through silicon controlled rectifier 97, none of the other indicator units within the group can exhibit a similar indication. Thus, as subsequent field contacts associated with indicator units within the group indicate a malfunction, the associated indicator units will indicate the malfunction by the lamps 40 becoming energized.

When Acknowledge Switch is actuated, it will be effective to remove power from the horn control circuit 54 as before. However, since the switch 26 is open between contacts 67 and 69, the actuation of the Acknowledge Switch 20 will not affect the operation of the indicator units 12.

In this connection, it will be noted that a signal is applied from the collector of transistor 116 to the gate of SCR 68 through a differentiating network comprising capacitor 73 and resistor 75. The signal will thereby be applied to the gate electrode of the silicon controlled rectifier 68 of a character to cause the silicon controlled rectifier 68 to switch to the low impedance state each time the potential at the collector of transistor 116 of any of the indicator units increases. The horn will, therefore, be actuated when the first lamp 40 within a group is energized and when a field contact first becomes abnormal subsequent to operation of the Acknowledge Switch.

It will be noted that each of the operations described above is for a nonlatching system. That is, transistor 94 of an individual indicator unit 12 will be on only so long as the associated field contact exhibits an abnormal condition. If it is desired that the indication of a malfunction persist subsequent to removal of the malfunction, a resistor 150, shown in phantom, can be connected between the collector of transistor 94 and the base of transistor 102. With the resistor 150 so connected, when transistor 94 turns on, a positive signal will be applied to the base of transistor 102, biasing transistor 102 on. So long as transistor 102 is on, and power is available at pin 1, transistor 94 will be biased on. Transistor 94 and transistor 102 thereby each provide biasing voltage for the other to turn the other on, and the reset switch must be operated to remove the indication of a malfunction. It will be noted that the specific example of the invention illustrated herein cannot be operated in the latching mode if a normally closed to +24 volts field contact is connected to pin 3. However, a modification of the invention to accomplish such a result can readily be devised by those skilled in the art.

From the above, it will be seen that the present invention provides an annunciator system especially adapted for operation in either the marked acknowledge mode or first out mode. The annunciator system of the present invention possess great utility in that it can be utilized with many types of inputs and also can be operated in either the latching or non-latching mode. In this connection, it will be appreciated that in many applications it is not necessary that an individual system be utilized with a wide variety of inputs or operated in different modes and, accordingly, particular systems may not incorporate the switches 25 and 26 as such but only include the necessary connections provided by a particular setting of the switch. In other instances, it may be desirable to provide individual switches corresponding to switches 25 and 26 for each indicator unit to thereby obtain even greater flaxibility. It can also be observed that, as compared to most prior art annunciator systems, the system of the present invention possesses advantages of simplicity and a reduced number of components, thereby substantially decreasing its cost and increasing its reliability.

Although the invention has only been described with respect to a preferred embodiment thereof, many changes and modifications will become apparent to those skilled in the art. The foregoing description is therefore intended to be illustrative and not limiting of the invention defined in the claims.

What I claim is:

1. An annunciator system comprising:
 (a) a group of indicating means to be associated with a group of variables;
 (b) each of said indicating means being capable of producing two different indications;
 (c) control circuit means effective to provide different indications by said indicating means including:
  (1) first and second signal responsive elements each having first and second electrodes, said first and second signal responsive elements normally exhibiting a high impedance between said two electrodes and a lower impedance when a signal is applied thereto,
  (2) a switching device having two electrodes, said device normally exhibiting a high impedance between said two electrodes and being switched to exhibit a low impedance between said two electrodes responsive to a control signal being applied to said device and remaining in said low impedance state so long as holding current flows through said two electrodes,
  (3) a first current path comprising the electrodes of said first and second signal responsive elements connected in series,
  (4) a second current path comprising the electrodes of said first signal responsive element and the electrodes of said switching device connected in series,
  (5) said indicating means effecting said first alarm indication responsive to the flow of current at said first current path and effecting said second indication responsive to the flow of current through said second current path,
  (6) means effective responsive to the associated variable exhibiting an abnormal condition for applying signals to said first and second signal responsive elements to cause said first and second signal responsive elements to exhibit said lower impedance and permit current to flow in said first current path, and
  (7) means for controlling the application of a control signal to said switching device to thereby control the flow of current in said second current path.

2. An annunciator system comprising:
 (a) a group of indicating means to be associated with a group of variables;
 (b) each of said indicating means being capable of producing two different indications; and
 (c) control circuit means effective to provide different indications by said indicating means including:
  (1) first and second transistors each having a base, an emitter and a collector,
  (2) a switching device having two electrodes, said switching device normally exhibiting a high impedance between said two electrodes and being switched to exhibit a low impedance between said two electrodes responsive to a control signal being applied to said device and remaining in said low impedance state so long as holding current flows through said two electrodes,
  (3) a first current path comprising the emitter-collector circuits of said first and second transistors connected in series, said indicating means effecting a first alarm indication responsive to the flow of current in said first current path,
  (4) a second current path comprising the emitter-collector circuit of said first transistor connected in series with the electrodes of said switching device, said indicating means effecting a second alarm indication responsive to the flow of current in said second current path,
  (5) means effective responsive to the associated variable exhibiting an abnormal condition for biasing said first and second transistors on to permit current to flow in said first current path, and
  (6) means for controlling the application of a control signal to said switching device to thereby control the flow of current in said second current path.

3. An annunciator system comprising:
(a) a group of indicating means to be associated with a group of variables;
(b) each of said indicating means being capable of producing two different indications; and
(c) control circuit means effective to provide different indications by said indicating means including:
(1) first and second transistors each having a base, an emitter and a collector,
(2) a switching device having two electrodes, said switching device normally exhibiting a high impedance between said two electrodes and being switched to exhibit a low impedance between said two electrodes responsive to a control signal being applied to said device and remaining in said low impedance state so long as holding current flows through said two electrodes,
(3) a first current path comprising the emitter-collector circuits of said first and second transistors connected in series, said indicating means effecting a first alarm indication responsive to the flow of current in said first current path,
(4) a second current path comprising the emitter-collector circuit of said first transistor connected in series with the electrodes of said switching device, said indicating means effecting a second alarm indication responsive to the flow of current in said second current path,
(5) means effective responsive to the associated variable exhibiting an abnormal condition for biasing said first transistor on,
(6) means effective responsive to said first transistor being biased on for biasing said second transistor on,
(7) means for controlling the application of a control signal to said switching device to switch said switching device to the low impedance state when said first transistor is on, and
(8) means for biasing said second transistor off when said switching device is in the low impedance state.

4. An annunciator system as defined in claim 3 wherein said means effective responsive to the associated variable exhibiting an abnormal condition comprises a third transistor having a base, an emitter and a collector, means for biasing said third transistor on responsive to the associated variable exhibiting an abnormal condition, and means connecting said third transistor to bias said first transistor on responsive to said third transistor being biased on.

5. An annunciator system as defined in claim 4 further including means effective responsive to said first transistor being biased on for biasing said third transistor on.

6. An annunciator system as defined in claim 3 wherein said switching device is a silicon controlled rectifier.

7. An annunciator system comprising:
(a) a group of indicator units to be associated with a group of variables;
(b) each of said indicator units including first and second alarm indicating means for producing two different indications;
(c) each of said indicator units including a control circuit means responsive to said associated variable to provide different indications by said indicating means and ncluding:
(1) first, second and third transistors each having base, collector and emitter electrodes,
(2) a silicon controlled rectifier having two power electrodes and a gate electrode,
(3) a first current path comprising the emitter-collector circuits of said first and second transistors connected in series with said first alarm indicating means, said first alarm indicating means effecting said first alarm indication responsive to the flow of current in said first current path,
(4) a second current path comprising the emitter-collector circuit of said first transistor connected in series with the power electrodes of said silicon controlled rectifier and said second alarm indicating means, said second alarm indicating means effecting said second alarm indication responsive to the flow of current in said second current path,
(5) means effective responsive to said third transistor being biased on for biasing said first transistor on,
(6) means effective responsive to said first transistor being biased on for biasing said second transistor on,
(7) means effective responsive to conduction of said silicon controlled rectifier for biasing said second transistor off,
(8) means effective for biasing one of said first and third transistors on responsive to the associated variable indicating an abnormal condition, and
(9) means effective for applying to the gate electrode of said silicon controlled rectifier a control signal to turn said silicon controlled rectifier on responsive to one of the operation of an acknowledge switch and the associated variable being the first of a group to become abnormal.

8. An annunciator system as defined in claim 7 further including means effective for biasing said third transistor on responsive to said first transistor being biased on.

9. An annunciator system comprising:
(a) a group of indicating means to be associated with a group of variables;
(b) each of said indicating means being capable of producing two different indications;
(c) one of said indications indicating that the associated variable is the first of said group of variables to become abnormal and the other of said indications indicating that the associated variable became abnormal subsequent to the time that another variable within the group became abnormal;
(d) a group of control circuit means associated with said group of indicating means effective responsive to said variables for controlling the indication provided by said indicating means each including:
(1) first and second signal responsive elements each having first and second electrodes, said first and second signal responsive elements normally exhibiting a high impedance between said two electrodes and a lower impedance when a control signal is applied thereto,
(2) a first switching device having two electrodes, said device normally exhibiting a high impedance between said two electrodes and being switched to exhibit a low impedance between said two electrodes responsive to a control signal being applied to said device and remaining in said low impedance state so long as holding current flows through said two electrodes,
(3) a first current path comprising the electrodes of said first and second signal responsive elements connected in series,
(4) a second current path comprising the electrodes of said first signal responsive element and the electrodes of said switching device connected in series,
(5) said indicating means effecting said other indication responsive to the flow of current in said first current path and effecting said one indication responsive to the flow of current through said second current path,
(6) means effective responsive to a malfunction to apply a signal to said first signal responsive element to cause said first signal responsive element to exhibit said lower impedance,
(7) means effective responsive to the flow of current through the electrodes of said first signal responsive element for applying to said second signal responsive element a signal to cause said second signal responsive element to exhibit a low impedance between said electrodes whereby current will flow through said first current path causing said indicating means to effect said other alarm indication, and
(8) means effective responsive to the flow of current through said first signal responsive element for applying to said switching device a control signal to switch said switching device to the low impedance state whereby current will flow in said second current path causing said indicating means to effect said one alarm indication,
(e) a second switching device commonly connected to each control circuit means within said group;
(f) means for applying to said second switching device a signal of a character to cause said second switching device to switch to the low impedance state subsequent to one of said first switching means being switched to the low impedance state; and
(g) means commonly connecting said second switching device to all of the control circuit means within a group to prevent the application of a control signal to the first switching device of another control circuit means within said group when said second switching means is in the low impedance state.

10. An annunciator system comprising:
(A) a group of indicator units to be associated with a group of variables;
(B) each of said indicator units including:
(1) first and second alarm indicating means for producing two different indications,
(2) one of said indications indicating that the associated variable is the first of said group of variables to become abnormal and the other of said indications indicating that the associated variable became abnormal subsequent to the time that another variable within the group became abnormal; and
(3) control circuit means effective responsive to said variables for controlling the indication provided by said indicating means including:
(a) first and second transistors each having a base, emitter and collector electrodes,
(b) a first switching device having two electrodes, said switching device normally exhibiting a high impedance between said two electrodes and being switched to exhibit a low impedance between said two electrodes responsive to a control signal being applied to said device and remaining in said low impedance state so long as holding current flows through said two electrodes,
(c) a first current path comprising the emitter-collector circuits of said first and second transistors connected in circuit with said alarm indicating means, said first alarm indicating means effecting said first alarm indication responsive to the flow of current in said first current path,
(d) a second current path comprising the emitter-collector circuit of said first transistor connected in series with said two electrodes of said first switching device and said second alarm indicating means, said second alarm indicating means effecting said second alarm indication responsive to the flow of current in said second current path,
(e) means responsive to a malfunction at one of said variables to apply a signal to said first transistor of the associated indicator unit to bias said first transistor on,
(f) means effective responsive to the flow of current in the emitter-collector circuit of said first transistor for biasing said second transistor on and applying a control signal to said first switching device of a character to cause said first switching device to switch to the low impedance state,
(g) means responsive to the flow of current in said second current path for biasing said second transistor off,
(C) a second switching device of the same character as said first switching device; and
(D) means commonly connecting said second switching device to all of the control circuits within a group to prevent the application of a control signal to the first switching means of each control circuit within said group when said second switching device is in the low impedance state.

11. An annunciator system as defined in claim 10 wherein said first and second switching devices are silicon controlled rectifiers.

12. An annunciator system as defined in claim 10 wherein at least one of said control circuit means further includes a third transistor, means biasing said third transistor on responsive to the associated variable becoming abnormal, and means effective for biasing said first transistor on responsive to said third transistor being biased on.

13. An annunciator system as defined in claim 12 further including means for biasing said third transistor on responsive to said first transistor being biased on.

14. An annunciator having selectively variable modes of operation comprising:
a first alarm indicator,
a second alarm indicator,
a circuit for operating said alarm indicators in response to an abnormality in a group of associated variables,
said circuit including first means for operating said alarm indicators so that the first alarm indicator is actuated upon the occurrence of a first abnormality, and subsequent abnormalities actuate said second alarm indicator comprising a first mode of operation,
said circuit including
second means for operating said alarm indicators so that upon the occurrence of a first abnormality said second alarm indicator is actuated,
and an acknowledgment means for operating said second indicator comprising a second mode of operation; and
function means for selectively rendering said first or second means operable in said circuit for selecting said first mode or said second mode of operation for said annunciator.

15. The annunciator of claim 14 wherein said first means for operating said alarm indicators includes:
(1) first and second signal responsive elements each having first and second electrodes, said first and second signal responsive elements normally exhibiting a high impedance between said two electrodes and a lower impedance when a control signal is applied thereto,
(2) a first switching device having two electrodes, said device normally exhibiting a high impedance between said two electrodes and being switched to exhibit a low impedance between said two electrodes responsive to a control signal being applied to said device and remaining in said low impedance state so long as holding current flows through said two electrodes,
(3) a first current path comprising the electrodes of said first and second signal responsive elements connected in series,
(4) a second current path comprising the electrodes of said first signal responsive element and the electrodes of said switching device connected in series, (5) said first indicator responsive to the flow of current in said first current path and said second indicator responsive to the flow of current through said second current path, (6) means responsive to an abnormality for applying a signal to said first signal responsive element causing said first signal responsive element to exhibit said lower impedance, (7) means responsive to the flow of current through the electrodes of said first signal responsive element for applying to said second signal responsive element a signal to cause said second signal responsive element to exhibit a low impedance between said electrodes whereby current will flow through said first current path causing said first indicator to effect said second alarm indicator, (8) means responsive to the flow of current through said first signal responsive element for applying to said first switching device a control signal to switch said switching device to the low impedance state whereby current will flow in said second current path causing said indicators to effect said first alarm indicator, (9) a second switching device commonly connected to said indicators; and

(10) means for applying to said second switching device a signal of a character to cause said second switching device to switch to the low impedance state subsequent to said first switching means being switched to the low impedance state, whereby said second switching device prevents the application of a control signal to said second indicator when said second switching device is in the low impedance state.

16. The annunciator of claim 15 wherein said second means includes:

means responsive to one of said variables becoming abnormal for biasing said first and second signal responsive elements on to permit current to flow in said first current path; and acknowledgment means operable to control the application of a control signal to said first switching device thereby controlling the flow of current in said second current path, whereby said second indicator is turned off and said first indicator is turned on in response to actuation of said acknowledgement means when said annunciator is operated in said second mode.

17. The annunciator of claim 14 including means for selectively rendering said circuit responsive to field contacts which are normally open or normally closed in response to the occurrence of an abnormality in one of said associated variables.

References Cited

UNITED STATES PATENTS

| 3,193,814 | 7/1965 | Foster | 340—213.1 |
| 3,254,331 | 5/1966 | Ida | 340—213.1 |

THOMAS B. HABECKER, Primary Examiner

U.S. Cl. X.R.

340—332, 415